[19] United States Patent
Furkert

[11] 3,954,955
[45] *May 4, 1976

[54] PROCESS FOR WORKING UP THE WASH SOLUTION OBTAINED IN THE WASHING OF $SO_2$-CONTAINING OFF-GASES

[75] Inventor: Herbert Furkert, Grosskonigsdorf, Germany

[73] Assignee: Davy Powergas GmbH, Cologne-Braunsfeld, Germany

[ * ] Notice: The portion of the term of this patent subsequent to Mar. 5, 1991, has been disclaimed.

[22] Filed: Aug. 30, 1972

[21] Appl. No.: 284,709

Related U.S. Application Data

[63] Continuation-in-part of Ser. No. 228,258, Feb. 22, 1972, Pat. No. 3,795,731.

[30] Foreign Application Priority Data

Aug. 31, 1971 Germany............................ 2143444

[52] U.S. Cl.............................. 423/541 A; 423/242
[51] Int. Cl.² .................. C01B 17/60; C01B 17/50
[58] Field of Search ........... 423/522, 539, 541, 542, 423/544, 545, 547, 550, 242, 523

[56] References Cited
UNITED STATES PATENTS

| | | | |
|---|---|---|---|
| 1,823,372 | 9/1931 | Merriam | 423/522 |
| 2,406,930 | 9/1946 | Titlestad | 423/522 |
| 2,862,789 | 12/1958 | Burgess | 423/550 |
| 3,275,407 | 9/1966 | Furkert et al. | 423/540 |
| 3,321,275 | 5/1967 | Furkert et al. | 423/540 |
| 3,359,069 | 12/1969 | Furkert et al. | 423/540 |
| 3,383,170 | 5/1968 | Furkert et al. | 423/541 |
| 3,645,683 | 2/1972 | Isbell, Jr. | 423/540 |

OTHER PUBLICATIONS

Olsen J. C., Unit Process and Principles of Chemical Engineering, Duan Nostrand Co., N.Y., N.Y., 1932, pp. 1-3.

*Primary Examiner*—Oscar R. Vertiz
*Assistant Examiner*—Gary P. Straub
*Attorney, Agent, or Firm*—Millen, Raptes & White

[57] ABSTRACT

In a process which comprises scrubbing an $SO_2$-containing gas with an aqueous ammonia solution to form ammonium sulfite and ammonium bisulfite as reaction products, neutralizing said reaction products with sulfuric acid to form $SO_2$ and aqueous ammonium sulfate, and concentrating the resultant aqueous ammonium sulfate by evaporation, the improvement which comprises:

a. heating the concentrated aqueous ammonium sulfate to a temperature of 900°–1250°C in a combustion chamber burning a carbon or sulfur containing fuel, in the presence of sufficient oxygen to maintain an oxygen content of 1–10 vol % in the gas exiting from the combustion chamber, to form a hot split gas consisting essentially of sulfur dioxide, sulfur trioxide, molecular nitrogen, molecular oxygen and water vapor; and b. heat exchanging the hot split gas with the aqueous ammonium sulfate to evaporate the aqueous ammonium sulfate to a concentrate having a water content of less than 55 wt. %, thereby cooling said hot split gas.

The split gas can be furhter worked up for any purpose which an $SO_2$-containing gas is suitable, e.g., for the production of sulfuric acid.

8 Claims, 1 Drawing Figure

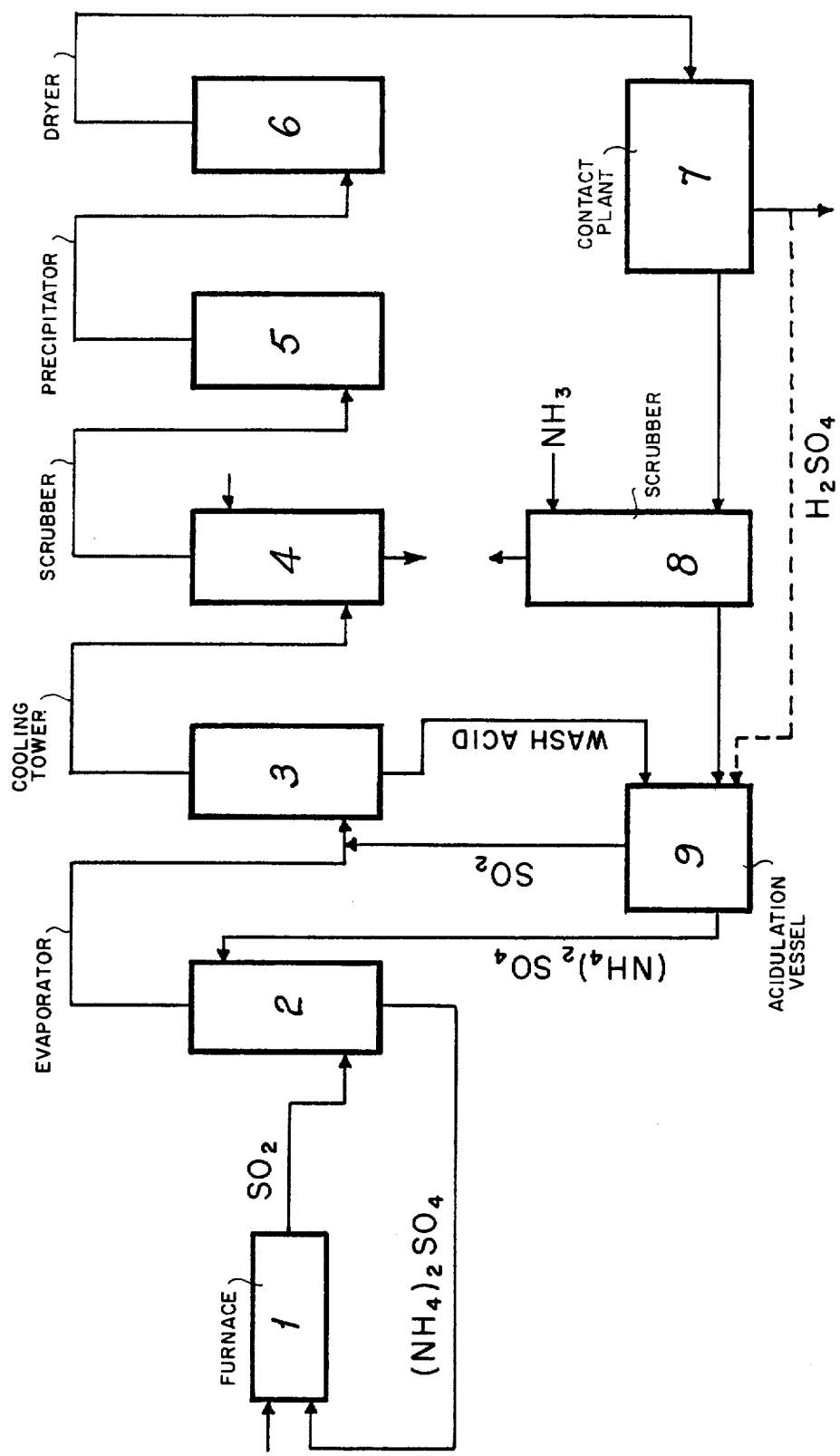

3,954,955

PROCESS FOR WORKING UP THE WASH SOLUTION OBTAINED IN THE WASHING OF SO$_2$-CONTAINING OFF-GASES

CROSS REFERENCE TO RELATED APPLICATION

This application is a continuation-in-part of copending, commonly assigned U.S. patent application Ser. No. 228,258 filed Feb. 22, 1972, now U.S. Pat. No. 3,795,731.

BACKGROUND OF THE INVENTION

The present invention relates to a process for working up the wash solution obtained in the washing of SO$_2$-containing off-gases, which can also contain SO$_3$, using ammonia.

It is known to wash SO$_2$-containing gases, e.g., the end gas from a plant for the production of sulfuric acid by the contact process, or flue gas from the combustion of sulfur containing fuels, by adding ammonia or an aqueous ammonium hydroxide solution to the wash solution. The ammonium hydroxide solution can contain generally 10–30 wt.% NH$_4$OH. The wash solution contains primarily ammonium sulfite and ammonium bisulfite. The washing process can be conducted in a variety of ways, e.g. by contacting the SO$_2$-containing gas countercurrently with an aqueous ammonium sulfites-containing spray, generally but not necessarily at a temperature of 40° to 60°C and a pressure of about one atmosphere.

In so far as the off-gas also contains sulfur trioxide, or an oxidation potential for oxidation of sulfite to sulfate exists, the wash solution can also contain ammonium sulfate.

U.S. Pat. No. 3,321,275 describes a process for the disposal of this wash solution in an environmentally harmless manner. Hence it is known to acidify the solution by adding ammonium hydrogen sulfate, whereby SO$_2$ is liberated, to evaporate the solution for recovery of the ammonium sulfate from the solution, and, in stages, to split it into ammonia and SO$_2$. This process indeed permits the recovery of the ammonia required for the off-gas washing; but it requires a considerable capital expenditure for the necessary multistage plant.

U.S. Pat. No. 3,359,069 describes a process for the production of sulfur dioxide-containing gases by the thermal decomposition of waste sulfur acids and their ammonium salts in the presence of oxygen. These waste sulfur acids contain, for example, 34 wt.% water while solutions coming from washing off-gases contain about 55 wt.% water. The thermal decomposition of such wash solutions results in split gases which are too poor in SO$_2$ for an economic production of sulfuric acid. Combustion of sulfur or hydrogen sulfide in order to increase the SO$_2$ content of the spent gas would result an unacceptable compulsory production of sulfuric acid.

U.S. Pat. No. 3,383,170 describes a process for recovering ammonia in yields of at least 95% from feeds containing ammonium sulfate and/or ammonium bisulfate by heating to temperatures of 200°–450°C. NH$_3$ is produced from the decomposition of ammonium sulfate, whereafter ammonium bisulfate is reduced to the bisulfite, which reacts to form SO$_2$ and ammonium sulfate; the process is controlled so that the amounts of NH$_3$ and SO$_2$ correspond to the initial NH$_4$ and SO$_4$ content of the feed. The price of ammonia decides whether combustion of ammonium salts of sulfur acids into N$_2$, H$_2$O and SO$_2$ (U.S. Pat. No. 3,359,069) is more economical than recovery of NH$_3$ and SO$_2$ (U.S. Pat. Nos. 3,321,275 and 3,383,170). The present U.S. patent application describes a technical and economical improvement of the process (U.S. Pat. No. 3,359,069) applied for solutions containing ammonium salts of sulfur acids obtained in the SO$_2$-containing off-gases.

OBJECTS OF THE INVENTION

Accordingly, it is an object of this invention to provide an environmentally harmless process for the disposal of the wash solution obtained by washing SO$_2$-containing gas by adding ammonia.

Another object of this invention is to provide a process for recovering the sulfur values of such wash solutions in a thermally efficient manner.

A further object of this invention is to provide a process for the production of SO$_2$-containing gas suitable for use in the contact process of preparing sulfuric acid.

Other objects and advantages of this invention will become apparent to those skilled in the art upon further study of the specification and appended claims.

SUMMARY OF THE INVENTION

Briefly, the above and other objects are attained in one aspect of this invention by providing, in a process which comprises scrubbing an SO$_2$-containing gas with an aqueous ammonia solution to form ammonium sulfite and ammonium bisulfite as reaction products, neutralizing said reaction products with sulfuric acid to form SO$_2$ and aqueous ammonium sulfate, and concentrating the resultant aqueous ammonium sulfate by evaporation, the improvement which comprises:

a. heating the concentrated aqueous ammonium sulfate to a temperature of 900°–1250° C in a combustion chamber burning a carbon or sulfur containing fuel, in the presence of sufficient oxygen to maintain an oxygen content of 1–10 vol % in the gas exiting from the combustion chamber, to form a hot split gas consisting essentially of sulfur dioxide, sulfur trioxide, molecular nitrogen, molecular oxygen and water vapor; and b. heat exchanging the hot split gas with the aqueous amonium sulfate to evaporate the aqueous ammonium sulfate to a concentrate having a water content of less than 55 wt. %, thereby cooling said hot split gas.

The heat-exchanged split gas which serves as a carrier for the removal of water from the evaporation stage (b) can be further cooled by scrubbing with sulfuric acids of medium concentration formed from the sulfur trioxide content in the split gas, which sulfuric acid can be used for the neutralization step. Additional split gas can be cooled to condense a large portion of the water vapor therefrom, and the condensate can be disposed of as an effluent.

In one aspect, the present process has additional advantages in that the neutralization and heat exchange techniques can be simultaneously carried out in a single combined stage. The neutralization by the addition of recycled sulfuric acid can be omitted if the split gas has a sufficient sulfur trioxide content to form sulfuric acid in the heat exchange step.

BRIEF DESCRIPTION OF THE DRAWING

The above and other objects of this invention will become more fully apparent to those skilled in the art from the following detailed discussion, taken in conjunction with the annexed Drawing, which schematically illustrates the flow sheet of a plant suitable for carrying out the process of this invention.

DETAILED DISCUSSION

It has now been found that the wash solution obtained in the washing of $SO_2$-containing off-gases using ammonia can be worked up utilizing its S-content for the production of sulfuric acid. In accordance with a preferred embodiment of the invention, the wash solution is mixed with a quantity of sulfuric acid at least sufficient for the liberation of $SO_2$ from the ammonium sulfite and ammonium hydrogen sulfide, i.e. 1 mole of sulfuric acid for every 2 moles of ammonium bisulfite and 1 mole of sulfuric acid for each mole of ammonium sulfite present in the wash solution. The total content and relative amounts of $(NH_4)_2SO_3$ and $NH_4HSO_3$ can be determined by routine analysis. Alternatively, $H_2SO_4$ can be added in an amount sufficient to result in the carryover of $H_2SO_4$ into the reaction product, which is indicative of the essentially complete conversion of the sulfite and bisulfite into the sulfate. The use of excess $H_2SO_4$ on the one hand increases the consumption of sulfuric acid, but on the other hand it forms ammonium hydrogen sulfate, thus allowing concentrates of lower water contents than ammonium sulfate without crystallization of any solid salt. A similar result is obtained when the wash solution is mixed with less than 1 mole of sulfuric acid per two moles of ammonium bisulfite and less than 1 mole of sulfuric acid per mole of ammonium sulfite. At 100°C ammonium bisulfate as well as ammonium sulfite are more soluble in water than ammonium sulfate.

The addition of less than stoichimetric amounts of $H_2SO_4$ results in incomplete conversion of the sulfite or bisulfite, and accordingly reduced liberation of $SO_2$. Subsequent combustion of sulfate, sulfite and bisulfite will convert these compounds into $N_2$, $H_2O$ and $SO_2$, but a split gas of reduced $SO_2$-concentration is produced. That, however, does not mean a disadvantage because less sulfuric acid has to be recycled to the evaporation and the splitting chamber, and less fuel and air is required. The addition of sulfuric acid in excess of the stoichiometric quantities is possible but wasteful with the result that, besides ammonium sulfate, ammonium hydrogen sulfate and possibly even free sulfuric acid are present in the solution. The resulting mixture is evaporated by direct heat-exchange with hot split gas from a water content of 70 to 45 wt.% by removal of 35 to 93% of the initial water content to evaporate the mixture down to a water content of from 15 to 55 wt.%.

In cases of less than stoichiometric addition of sulfuric acid before or during evaporation from the wash solution, some ammonia can be liberated. Surprisingly, if 10 to 20% of the stoichiometric amount of sulfuric acid is added, only 2 to 3% of the ammonia present in the wash solution is liberated. Even when the acidulation is omitted, only little more than 3% of the total ammonia is liberated. Such small ammonia contents in the split gas are environmentally harmless. It is absorbed completely by scrubbing the split gas with medium concentrated sulfuric acid for cooling purposes. This acid, containing some ammonium sulfate, is recycled to the evaporation apparatus and splitting chamber. Even small concentrations of ammonium sulfate in the condensate of the washing tower are harmless.

The hot split gas is preferably the $SO_2$-containing gaseous reaction product obtained by heating ammonium sulfate at a temperature of 900°–1250°C by combustion of a carbon and/or sulfur containing fuel; such a gas preferably consists essentially of $SO_2$, $SO_3$, $N_2$, $O_2$, and water vapor, without substantial ammounts of nitrogen oxides. The split gas, after being used for the evaporation, is worked up, e.g. by a contact oxidation process to sulfuric acid. The total S-content of the wash solution is recovered in this way as sulfuric acid in usual yields, and the ammonia in the spent gas is practically completely oxidized to nitrogen. In spite of the destruction of the ammonia, the process has low operational cost owing to the utilization of the heat of the hot split gas for the evaporation of water from the wash solution. If sulfuric acid is added, the quantity should be so regulated that the 4-valent sulfur contained in the wash solution according to both or at least the first or the second of the equations,

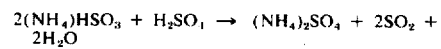

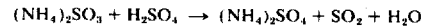

is liberated.

Preferably the solution is evaporated down to a water content of from 25 to 50 wt.%$H_2O$ before the splitting operation. In this way ammonium sulfate can partly crystallize out while the concentrated slurry mixture possesses a pumpable consistency. Evaporation of the aqueous solution down to less than 25 wt.% $H_2O$ and even below 15 wt.% is possible with addition of more or less than stoichiometric amounts of sulfuric acid, because ammonium hydrogen sulfate or the ammonium sulfites are highly soluble in water and the bisulfate can even be concentrated to a water-free melt.

The preferred temperature range for the splitting is from 1000° to 1100°C. In order to keep the formation of nitrogen oxides negligably small in the splitting, the $O_2$-content of the split gas at the exit of the splitting chamber is advantageously maintained at a value of from 1 to 10 vol.%, preferably 3 to 5 vol.%. The residence time in the splitting chamber of the material to be split preferably lies in the range from 0.3 to 15 seconds. Natural gas, fuel oil (especially sulfur-rich fuel oil), hydrogen sulfide and sulfur can for example be used as fuel. These fuels can be used alone or as mixtures of two or more. Details of a suitable process are more particularly disclosed in U.S. Pat. No. 3,761,575, the contents of which are incorporated by reference herein.

The split gas is cooled down by heat exchange in the evaporation stage from the splitting temperature of, e.g., 1000° to 1100°C, to a temperature of preferably from 100° to 350°C. The temperature of the split gas on leaving the evaporation stage determines its maximum water content. The water content should be sufficiently high so that all the water introduced into the process with the wash solution and the sulfuric acid used for the acidification is removed by means of the split gas. The split gas thus serves as a carrier for the removal of water from the evaporation stage. It is advantageously further cooled by conventional means after leaving the evaporation stage to about 20° to 60°C, preferably 30° to 40°C, whereby the water vapor present is largely condensed. The water condensing out of the split gas contains dissolved $SO_2$, and the condensate is suitably treated with air in a stripper column for the removal of this $SO_2$. The $SO_2$-laden air is advantageously used as combustion air for the splitting operation.

According to one embodiment of the process of the invention the split gas after use for the evaporation is washed by recycled condensate to remove sulfur trioxide and sulfuric acid mist. In this stage a wash acid of medium $H_2SO_4$ concentration is formed from the $SO_3$-content of the split gas and $SO_2$-containing gases from any other sources which are further worked up to sulfuric acid. The wash acid is mixed with the wash solution obtained from washing end or flue gases according to the invention.

In the evaporation stage according to the invention the split gas is scrubbed by the wash solution. Thus $SO_3$ and $H_2SO_4$ mist can already be removed from the split gas and absorbed by the wash solution. By this way the wash solution is not only evaporated but acidulated simultaneously. This provided, the wash acid obtained in the cooling stage is very weak and can be discarded.

According to another embodiement of the process of the invention the wash solution to be worked up is mixed with a portion, e.g. 0.2 to 2% of then sulfuric acid product. The sulfuric acid produced is the led back to the process according to the invention if insufficient wash acid is formed and in addition no waste sulfuric acid is available. This is particularly the case in the removal of sulfur oxides from flue gases by washing with a solution of ammonium sulfites and application of ammonia. The wash solution and the sulfuric acid required for the liberation of $SO_2$ can be sprayed into a tower through which the hot split gas is flowing upwardly. With this separate spraying in of wash solution and acid the split gas must be sprayed with sulfuric acid later in time than the spraying with solution, so that no ammonia escapes from the tower with the gas. Advantageously a portion of the sulfuric acid, particularly a stoichiometric amount for the liberation of $SO_2$, is sprayed together with the wash solution and the excess sulfuric acid is fed in higher up the tower so that residual ammonia contained in the gas is intercepted and removed.

According to one more embodiment of the process of the invention, the liberated $SO_2$ is separated from the mixture of wash solution and sulfuric acid and then added to the split gas. In this case the wash solution and sulfuric acid are not mixed in the tower together with the evaporation but take place in a separate mixing stage where the $SO_2$ is liberated immediately in the gaseous state. The split gas is enriched with the liberated $SO_2$. The resulting aqueous phase, a concentrated or saturated solution of ammonium sulfate, also containing some ammonium sulfit or ammonium hydrogen sulfate, is charged to the evaporation apparatus.

Referring now to the Drawing, a plant for working up the wash solution includes a splitting chamber 1, an evaporation apparatus 2 and a mixing apparatus 9. The symbols 3 to 8 show a sulfuric acid plant of known type which comprises a cooling tower 3, a wash tower 4, an electrostatic gas purifying plant 5, a drying tower 6, a contact process and absorption plant 7 and an end gas washing plant 8.

The end gas from the contact process and absorption plant 7 is washed in the tower 8 with use of ammonia, so that an ammonium sulfite and ammonium hydrogen sulfite solution results. The solution is acidified in the mixing apparatus 9 with the use of wash acid from the cooling tower 3 and optionally acid product from the contact process plant 7 (dashed line). The liberated $SO_2$ is charged to the split gas stream between the evaporation apparatus 2 and the cooling tower 3. The addition can also occur at a later point in the production scheme. The ammonium sulfate containing solution formed in the mixing apparatus 9 is sprayed into the evaporating tower 2 and therein brought into contact with the split gas of about 1000°C from the splitting chamber 1. In the bottom of the evaporation apparatus 2 a pasty 80 to 85% ammonium sulfate suspension collects and is sprayed into the splitting chamber 1. The $SO_2$-containing split gas formed in the chamber 1 flows through the evaporation apparatus 2, thereby becoming laden with water vapor, which is condensed out, for the most part, in the cooling tower 3 and in the washing tower 4. The gas then passes in known manner through the electrostatic gas purification 5 and the drying tower 6 into the contact process plant.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

In a sulfuric acid plant, which manufactures 1477 tons per day $H_2SO_4$ with a yield of 97.5 to 98%, the end gas leaving the absorber is washed in two stages with use of about 9.9 tons per day dry ammonia. In this way there are formed about 100 tons per day of wash solution of the following composition: 17 wt.% ammonium sulfate, 13.5 wt.% ammonium hydrogen sufite, 9.5 wt.% ammonium sulfite and 60 wt.% water.

For working up, the wash solution is sprayed together with 100 tons per day of 14.7% sulfuric acid into a tower which has an acid-proof lining and through which hot split and flue gases flow. The acid is taken from the cooling and wash towers of the sulfuric acid plant where it occurs as otherwise difficultly usable by-product. Ammonium sulfate and sulfur dioxide are formed in the tower from the wash solution and the sulfuric acid. Enough water is evaporated that a solution of 51.8 wt.% ammonium sulfate and 48.2% water flows and 488,000m³ (S.T.P.) per day of gas mixture, the water content of which is about 50% vapor, leave the tower. The split gas contains, calculated on a dry basis, 4.6 vol.% $SO_2 + SO_3$, 4.9 vol.% $O_2$, 7.1 vol.% $CO_2$ and 83.4 vol.% $N_2$.

The concentrated ammonium sulfate solution is charged to a furnace having a temperature- and acid-proof lining with 238,000m³ (S.T.P.) per day of air and 18,000m³ (S.T.P.) per day of natural gas (calorific value 7600 kcal/m³ S.T.P.) and burnt at 1000° to 1100°C. The gas leaving the furnace has a temperature of about 1000°C and contains about 3.5 vol.% $O_2$. It is cooled down to about 360°C in the evaporating apparatus. It is then worked up to sulfuric acid in a known manner. The content of nitrogen oxides in the concenrated sulfuric acid produced is of the order of 1 to 10mg/kg. The sulfuric acid yield is significantly improved, namely from 1477 tons/day by 34 tons/day derived from the wash solution and 14.7 tons/day derived from the wash acid to a total of almost 1525 tons/day.

The process according to the invention is also particularly suitable for the purification of flue gases from sulfur-containing fuels. Then a sulfuric acid plant as usual for the cold gas process designed at least for the volume of the split gas coming out of the evaporating tower is required. In this case the quantity of wash acid which results with the cooling and purifying of the split gas is not sufficient for the stoichiometric demand of the ractions with the ammonium sulfites. It is therefore necessary also to recycle sulfuric acid product, or in order to save operation costs, to apply less than the stoichiometric quantity of sulfuric acid according to the invention.

The process according to the invention can be combined with the catalytical process type for wet hot gases. A part of the hot slit gas is used for the evaporation of the wash solution, then cooled as usual to condensate the excess water and reunified with the other part of the hot split gas whereby the mixture has a temperature of about 450°C as necessary for starting the catalytical oxidation of the $SO_2$.

The preceeding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof can make various changes and modifications of the invention to adapt it to various usage and conditions.

What is claimed is:

1. In a process which comprises scrubbing an $SO_2$-containing gas with an aqueous scrubbing solution to which ammonia is added to form ammonium sulfite and ammonium bisulfite as reaction products, adding to said sulfite and bisulfite solution a stoichiometric amount of sulfuric acid required for the liberation of all $SO_2$ from said reaction products to form $SO_2$ and a neutral aqueous solution of ammonium sulfate, concentrating the resultant neutral aqueous ammonium sulfate by evaporation and splitting the concentrated aqueous ammonium sulfate at a temperature of 900°–1250°C in a combustion chamber burning a carbon or sulfur containing fuel in the presence of sufficient oxygen to maintain an oxygen content of 1–10 vol. % in the gas exiting from the combustion chamber to form a hot split gas consisting essentially of sulfur dioxide, molecular nitrogen, molecular oxygen and water vapor, the improvement which comprises: heat exchanging said hot split gas with said aqueous ammonium sulfate to evaporate said aqueous ammonium sulfate to a concentrate having a water content of less than 55 wt. %, thereby cooling said hot split gas.

2. A process according to claim 1, wherein 40–70% of the water present in said aqueous ammonium sulfate is evaporated to form a concentrate having a water content of 15–55 wt. %.

3. A process according to claim 2, wherein said aqueous ammonium sulfate is evaporated to a water concentration of 25–50 wt. %.

4. A process according to claim 1, wherein said hot split gas is cooled to a temperature of 100°–350°C.

5. A process according to claim 4, further comprising additionally cooling said hot split gas to below 100°C to form an aqueous condensate containing $SO_2$ dissolved therein.

6. A process according to claim 5, further comprising stripping said condensate to form an $SO_2$-laden gas, and feeding said $SO_2$-laden gas into said combustion chamber.

7. A process according to claim 1, further comprising conducting said neutralization step and heat exchange step in a single operational step.

8. A process according to claim 1, wherein the heat exchanged split gas is washed with sulfuric acid to absorb ammonia therefrom.

* * * * *